United States Patent [19]
Pizzorno

[11] Patent Number: 5,804,028
[45] Date of Patent: Sep. 8, 1998

[54] APPARATUS FOR LOOPING A COATING STRUCTURE AROUND A BEAD CORE IN MOTOR-VEHICLE TIRES

[75] Inventor: Augusto Pizzorno, Milan, Italy

[73] Assignee: Pirelli Coordinamento Pneumatici S.p.A., Milan, Italy

[21] Appl. No.: 802,555

[22] Filed: Feb. 19, 1997

Related U.S. Application Data

[62] Division of Ser. No. 320,689, Oct. 11, 1994, Pat. No. 5,651,849.

[30] Foreign Application Priority Data

Oct. 11, 1993 [IT] Italy .................................. MI93A2147

[51] Int. Cl.⁶ .................................................. B29D 30/50
[52] U.S. Cl. ........................ 156/421.4; 156/398; 156/460
[58] Field of Search ..................... 156/422, 460, 156/401, 421.4, 136, 130.7, 132, 135, 416, 213, 398

[56] References Cited

U.S. PATENT DOCUMENTS

| | | | |
|---|---|---|---|
| 3,011,540 | 12/1961 | Vanzo et al. . | |
| 3,154,455 | 10/1964 | Nebout . | |
| 3,171,769 | 3/1965 | Henley et al. ........................... | 156/401 |
| 3,185,607 | 5/1965 | Nebout . | |
| 3,671,358 | 6/1972 | Henley et al. ........................... | 156/401 |
| 4,302,274 | 11/1981 | Enders ..................................... | 156/401 |
| 4,427,473 | 1/1984 | Shichman et al. .................. | 156/421.4 |
| 4,450,025 | 5/1984 | Henley . | |
| 5,261,979 | 11/1993 | Caretta . | |
| 5,324,376 | 6/1994 | Weimer et al. .......................... | 156/401 |
| 5,350,470 | 9/1994 | Mochel et al. .......................... | 156/136 |
| 5,468,328 | 11/1995 | Kim et al. ............................... | 156/401 |

FOREIGN PATENT DOCUMENTS

| | | |
|---|---|---|
| 0492504 | 7/1992 | European Pat. Off. . |
| 1311161 | 10/1962 | France . |
| 2452175 | 5/1976 | Germany . |
| 2072592 | 10/1981 | United Kingdom . |

*Primary Examiner*—Geoffrey L. Knable
*Attorney, Agent, or Firm*—Stevens, Davis, Miller & Mosher, L.L.P.

[57] ABSTRACT

A method and apparatus for applying a ribbon-like coating structure to the outer surface of a tire bead core. A bead core (2) is coaxially placed around a support drum (6) carrying an inflatable air bag (7) disposed in a deflated condition. Clasping sectors (14) circumferentially distributed in the drum are radially moved close to the inner surface of the bead core (2) to make a central portion of a ribbon-like coating structure (3) arranged about the inflatable air bag (7), adhere against the bead core itself. The air bag is inflated so as to form, on opposite axial sides relative to the bead core (2), two lobes (17, 18) each of them being enclosed between the outer surface of the drum (6) and a respective annular opposition bell (19, 20) coaxially encircling the drum. By axially moving the opposition bells (19, 20), a first and a second side flap of the coating structure (3) are applied to respective surfaces of the bead core (2). The second flap overlaps the first flap and is fastened thereto on the radially external surface of the bead core (2).

8 Claims, 4 Drawing Sheets

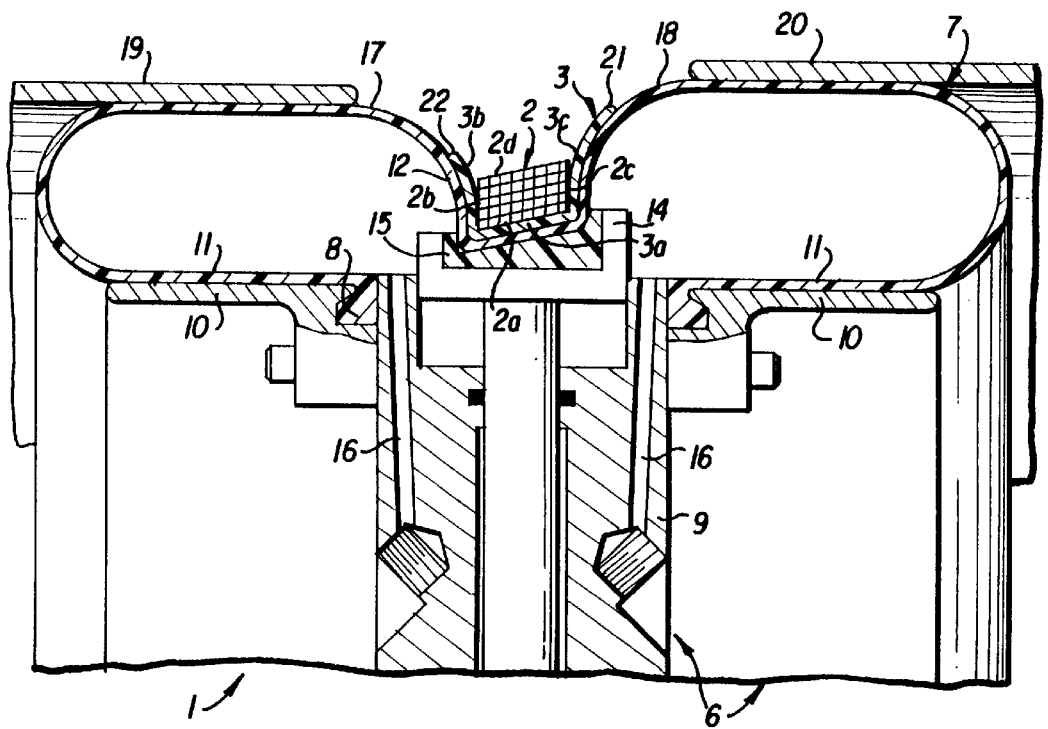

APPARATUS FOR LOOPING A COATING STRUCTURE AROUND A BEAD CORE IN MOTOR-VEHICLE TIRES

This is a division of application Ser. No. 08/320,689, filed Oct. 11, 1994 now Pat. No. 5,651,849.

BACKGROUND OF THE INVENTION

The present invention relates to a method and apparatus for looping a coating structure on bead cores in motor-vehicle tires.

It is known that incorporated in vehicle tires, at the so-called "beads" defined along the inner peripheral edges of the tire, are respective annular metal elements, circumferentially inextensible, currently referred to as "bead cores"; said bead cores perform a dual function, that of suitably stiffening the beads themselves for ensuring their stable connection with the rim on which the tire is mounted, and that of providing a steady anchoring to the carcass plies usually arranged in the tire itself.

In a particular embodiment, especially used with tubeless tires for heavy duty motor transport, said bead cores are formed with a plurality of bare metal wire coils having a right polygonal, preferably hexagonal section, disposed axially and radially close to each other so as to constitute an annular element having its radially inner surface inclined at 15° relative to its own axis: a plurality of clips, usually made of a metal material, distributed along the peripheral extension of said element and closed at the right section of same, keeps the element compact and its sectional shape constant during the tire manufacturing process.

The foregoing being stated, it is to be pointed out that during the tire manufacturing process suitable expedients are to be adopted so that a perfect adhesion of the bead core to the other elastomer components of the tire is ensured. The presence of detachment areas and air bubbles entrapped between the bead core and elastomer material disposed around said bead core would be in fact very detrimental to the structure integrity of the tire in use.

To this end, a coating structure made of elastomer material is provided to be applied to the bead core, which coating is adapted to be steadily anchored to the bare metal wires forming the bead core itself and to provide an appropriate attachment surface for the elastomer material components to be further assembled therewith.

To this end, of the great number of known structures, the structure described in U.S. Pat. No. 5,261,979 issued Nov. 16, 1993 in the name of the present assignee has proved to be of particular interest. It consists of a layer of elastomeric material directly wrapped on the bead core itself and a rubberized fabric ribbon provided with reinforcement cords of heat-shrinkable material wrapped around the elastomeric material layer so that said cords are disposed in a direction transverse to the longitudinal extension of the bead core.

In fact, during the tire vulcanization step, an excellent bonding is achieved between the elastomeric material and the bead core, due to the favorable compression action produced on the layer material as a result of the shrinkage of the rubberized fabric cords.

According to the above teachings, the coating structure that can be conveniently prepared separately by assembling the elastomeric material layer and rubberized fabric ribbon, so as to form a strip of appropriate width cut to size, is preferably enfolded loop-wise around the bead core, so that it integrally embraces the cross sectional profile of the bead core itself and locked in said position by overlapping of the longitudinal edges thereof.

This process is particularly convenient when bead cores of the described type are involved, in that it easily overcomes the difficulty embodied by the presence of clips along the peripheral extension of the bead core, which clips give rise to the discontinuity of the surface to be coated making it difficult to use other known methods and machines that bring about a serious negative impact on the final result of the operation.

Unfortunately this looping operation which is easy to do when bead cores of rubberized metal wire are involved, has proved to be a source of several drawbacks, both during its execution and as regards the quality of the finished product, when put into practice according to the known art with bead cores of the pack type, made of bare metal wires as previously described.

This is due to the fact that, with these bead cores, the stable positioning of the ribbon-like structures enfolded on the bead core exclusively depends on the mutual adhesion between the side edges of the coating structure itself, suitably overlapped and pressed against each other by said enfolding operation.

In fact, the adhesion of the raw elastomer material on the bare metal (that is not rubberized) is rather weak and at all events insufficient to ensure the temporary attachment of the first side flap of the coating structure to the bead core during the enfolding or looping operation, above all in the case in which said structure comprises nylon fibers or the like tending to resiliently take on their original conformation again after their enfolding about the bead core section.

In this case, due to the weak adhesiveness between the metal forming the bead core and the elastomeric material forming the coating, the elastic shrinkage of the material can cause separations and slidings of the first flap on the bead core, before said first flap is sealed to the second flap: the result is a loop which is not tensioned and can incorporate air bubbles and where the overlapping width between the two flaps varies along the longitudinal extension of the bead core, which rather often also gives rise to openings proper at the junction point between the two flaps, thereby making the shrinkage action developed by the cords during the tire vulcanization inefficient.

The problem does not seem to be resolvable with the teachings of U.S. Pat. No. 4,450,025, according to which the two flaps are first sealed to each other, at their surfaces axially internal to the loop and disposed in a diametrical plane of the bead core, then the sealed portion of the coating is folded back against the bead core surface.

A drawback present in this solution is, among other things, the fact that the overlapped flaps exhibit an unacceptable thickness at the junction, as compared to the quality standards presently required from the tires.

SUMMARY OF THE INVENTION

According to the present invention it has been found that by carrying out looping by means of an inflatable air bag defining, on laterally opposite sides of the bead core being worked, two lobes enclosed within respective annular opposition bells, axially movable and independent of each other, it is possible to keep the first side flap of the coating structure applied to the bead core while the second flap is being laid down, as far as overlapping between the two flaps begins, thereby eliminating the risk that an important portion of the first flap may be detached from the bead core before the second flap is applied thereto and therefore overlapping of the two flaps has occurred.

In a first aspect, the invention relates to a method for looping a coating structure on a motor-vehicle tire bead core, characterized in that it comprises the steps of:

circumferentially laying down a ribbon-like coating structure comprising at least one raw elastomeric material layer on a median region of an inflatable air bag flattened against an outer cylindrical surface of a support drum;

placing a bead core being worked to a coaxial position with, and close to said coating structure circumferentially laid down on the inflatable air bag, said coating structure having an overall width slightly greater than the circumference of the cross-sectional bead core profile;

pressing a plurality of clasping sectors circumferentially distributed on the support drum against the radially inner surface of the bead core, in order to fix the mutual positioning of the bead core and coating structure on the inflatable air bag;

inflating said air bag causing the radial expansion thereof in order to laterally bend, on opposite sides with respect to the bead core and upon the action of a first and a second lobe defined by the air bag itself, a first and a second side flap of the coating strip towards a first and a second side surface of said bead core;

counteracting the radial expansion of said lobes by a first and a second annular opposition bells each of them being disposed in coaxial relation around one of said lobes;

axially moving the first annular opposition bell towards said bead core, enfolding around it the first lobe of said air bag for progressively applying the first side flap of the coating structure to the corresponding side surface and at least one portion of the radially outer surface of the bead core;

axially moving the second annular opposition bell towards said bead core, enfolding around it the second lobe of said air bag for progressively applying the second side flap of the coating structure to the corresponding side surface and the uncoated (that is not coated with said first flap) surface portion of the bead core;

axially drawing the first annular bell away from the bead core while keeping on with the axial displacement of the second opposition bell for disengaging said first lobe from the first side flap of the coating structure immediately before the end edge of said second side flap is applied to the radially outer surface of the bead core coated with said first flap, so that said first and second side flaps are mutually fastened along the respective end edges overlapping each other at the radially outer surface of the bead core.

Preferably, the circumferential laying down of said coating structure comprises the steps of: circumferentially depositing at least one ribbon of rubberized fabric reinforced with heat-shrinkable material cords on said inflatable air bag; circumferentially depositing a layer of raw elastomeric material around said ribbon.

Advantageously, the radial extension of the air bag is stabilized to a predetermined and constant value, on varying of the inflating pressure of the air bag itself. The air bag is made axially inextensible and thus when counteracting the radial expansion of the inflatable air bag, adjustment of the axial expansion (and, of course, appropriate control of the expansion profile of each lobe), at the same time also becomes possible.

In a specific embodiment of the invention, said air bag is inflated to a pressure of between 2 and 4 bars, identical in both lobes, in that a fluid communication between the first and second lobes of the inflatable air bag is constantly maintained.

In a second aspect, the invention relates to an apparatus capable of looping up a coating structure on a motor-vehicle tire bead core, characterized in that it comprises:

a support drum;

an inflatable air bag having two circumferential anchoring beads coaxially fastened to the support drum, two connecting portions extending mutually away from said anchoring beads and one work portion radially external to said drum and extending between opposite ends of said connecting portions;

a plurality of clasping sectors distributed circumferentially around the drum and radially movable relative thereto between a rest position in which they are radially retracted towards the drum inside, and a work position in which they are radially extended and project from the drum in order to urge said work portion of the air bag against the radially internal surface of a bead core being worked and coaxially arranged on the drum surface;

fluid feeding means communicating with the inside of the air bag in order to bring it from a deflated condition in which it is disposed substantially flattened in a cylindrical configuration against said drum to an inflated condition in which it is radially expanded so as to form first and second lobes located on axially opposite sides relative to said plurality of sectors urged against said bead core;

one annular opposition bell to be coaxially positioned around the air bag to counteract by an inner surface thereof, the radial expansion of said first lobe, said first annular bell being axially movable relative to the drum for enfolding the first lobe around one side surface and the radially external surface of the bead core;

a second annular opposition bell disposed coaxially opposite to said first bell and designed to be positioned around the air bag in order to counteract, by its inner surface, the radial expansion of said second lobe, said second bell being axially movable relative to the drum, independently of said first bell, for enfolding the second lobe around a second side surface and the radially external surface of the bead core.

Advantageously, said inflatable air bag is formed of a rubberized fabric made inextensible in the axial direction relative to the air bag itself.

Said air bag, at the opposite ends of the work portion exhibits premoulded centering pieces folded back through 360°.

In a preferred embodiment the apparatus further comprises at least one elastic ring engaged circumferentially about said clasping sectors, said elastic ring exhibiting at a radially external position, an engagement seat substantially mating the radially internal surface of the bead core being worked.

Said annular bells may also have differentiated diameters with respect to each other.

BRIEF DESCRIPTION OF THE DRAWINGS

Further features and advantages will become more apparent from the detailed description of a preferred embodiment of a method and apparatus for looping up a coating structure on a bead core in vehicle tires according to the present invention, which description is given hereinafter by way of non-limiting example with reference to the accompanying drawings, in which:

FIG. 3 shows a subsequent inflating step of an expansible air bag associated with the drum within a pair of coaxial annular opposition bells;

FIG. 4 shows a step in which one annular opposition bell is axially moved for enfolding one lobe of the inflatable air bag about the bead core;

DETAILED DESCRIPTION OF PREFERRED EMBODIMENTS

Figure 1:
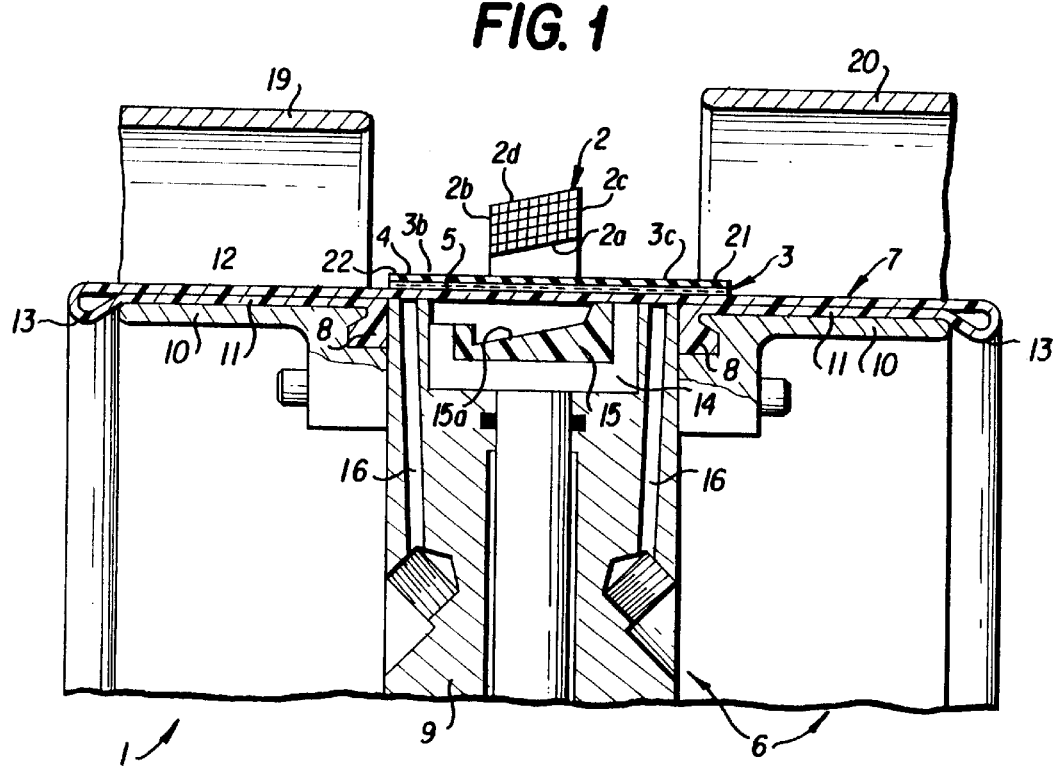
FIG. 1 is a diagrammatic part sectional view of an apparatus according to the invention, during the step of disposing a bead core around a support drum.
Figure 2:
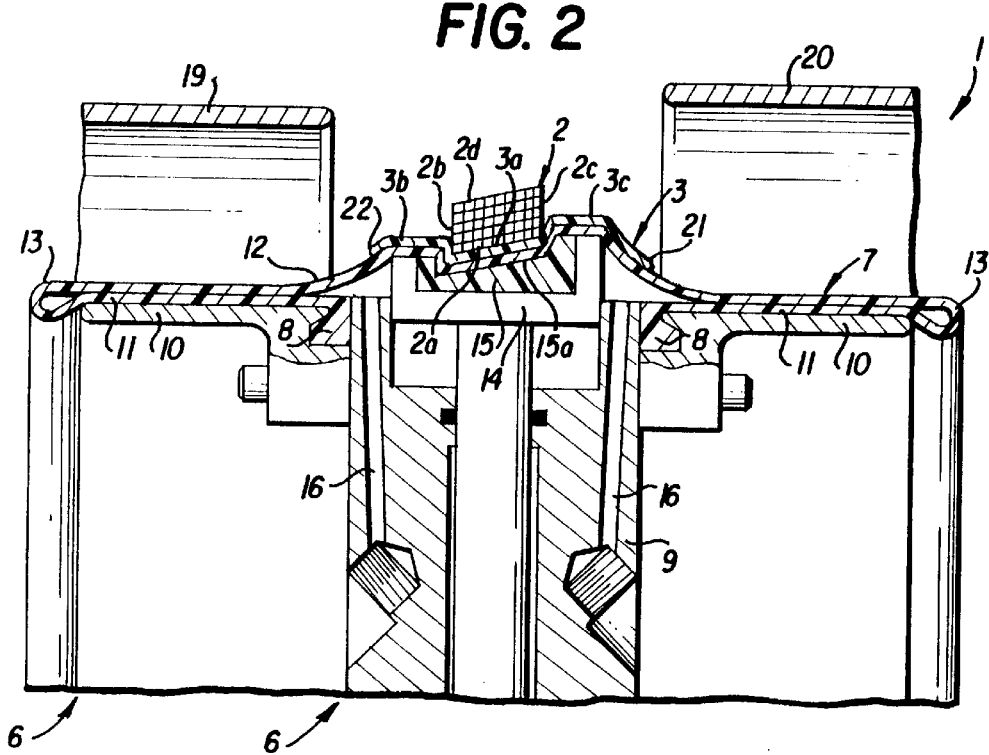
FIG. 2 shows a working step subsequent to the one shown in FIG. 1, involving the engagement of the bead core by clasping sectors radially movable relative to the drum.

Referring to the drawings, numeral 1 generally denotes an apparatus for looping up a coating structure on a bead core in vehicle tires in accordance with the present invention.

The apparatus 1 is arranged to apply a coating structure 3 to a bead core 2 in vehicle tires. In the embodiment shown said coating structure 3 essentially comprises at least one coating layer (skim coat) 4 made of raw elastomeric material to which a ribbon 5 of rubberized fabric is preferably coupled, in an overlaid relationship, which ribbon is comprised of reinforcing cords conveniently made of a heat-shrinkable material such as nylon, for example.

For simplicity and clarity purposes, only in FIG. 1 the layer 4 and ribbon 5 have been differently shown (using different section hatchings). During subsequent discussion in the present description such layer and ribbon will be generally referred to as strips.

The apparatus 1 comprises a support drum 6 rotatably supported in cantilevered fashion on a horizontal axis and around which an inflatable air bag generally identified by 7, externally extends. In greater detail, the air bag has two circumferential beads 8 coaxial with said drum and sealingly engaged between the main body 9 and respective collar-shaped extensions 10 of the drum 6. Extending axially outwardly from the beads 8 are two connecting portions 11 between the opposite ends of which a work portion 12 extends, at a radially external position.

Advantageously, the inflatable air bag 7 is made of a rubberized fabric provided with reinforcing cords extending axially from one bead to the other, said cords making the air bag inextensible in an axial direction, that is along its extension in the plane of a radial cross section; at its ends where the connecting portions 11 are fastened to the work portion 12, the air bag has two premoulded folded back pieces slightly projecting from the drum 6 and acting as centering elements for the air bag on the drum itself, as clarified below.

In addition, the radially external surface of said work portion 12 is coated with a layer of a material which is non-adhesive to a great degree for the purpose of minimizing adhesion between said surface and the coating structure 3 which is fitted on said air bag for subsequent placement on a bead core: for the purpose the silicone rubbers are a good option.

Also associated with the drum 6 is a plurality of clasping sectors 14 (only one of which is shown in the accompanying drawings) which are circumferentially distributed and slidably mounted for movement, in a radial direction, within the central body 9. The clasping sectors 14 are radially movable, upon command of a known actuator means (not shown), between a rest position in which, as shown in FIG. 1, they are radially retracted inwardly in the drum 6, and a work position in which, as shown in FIGS. 2 to 6, they are radially extended and project outwardly from the drum for retaining the bead core 2 being worked by exerting a thrust action against the radially internal surface 2a of the bead core, through the work portion 12 of the air bag 7.

Preferentially, the clasping sectors 14 are interconnected by at least an elastic ring 15 circumferentially engaged to said sectors and having, at a radially external position, an engagement seat 15a, the shape of which substantially mates with that of the radially internal surface 2a of the bead core 2, through which said clasping action of the sectors on the bead core is exerted.

Also provided is fluid feeding means 16 communicating with the inside of the air bag 7 in order to bring it from a deflated condition in which, as shown in FIG. 1, it is disposed substantially flattened in a cylindrical configuration against the drum 6, to an inflated condition in which, as shown in FIGS. 3 to 6, it is radially expanded thereby forming a first lobe 17 and a second lobe 18, disposed laterally on opposite sides with respect to said plurality of clasping sectors 14 exerting pressure against said bead core. In the example shown, said fluid feeding means are air passages 16 formed in the central body 9 of the drum 6 and opening into the air bag 7, in which passages compressed air or other working fluids under pressure are fed, in known and conventional manner.

In a simplified construction and operation of the machine and process of the invention, the lobes 17, 18 can be constantly put into fluid communication with each other, through the spaces existing between each clasping sector 14 and a circumferentially adjoining sector.

This expedient ensures a pressure evenness in both lobes in a very simple manner, when this feature is desired or is at all events acceptable.

Obviously, it may also be convenient, for the purpose of increasing flexibility, to modify the machine such that the lobes should be fed separately from each other, in order to be able to use a different pressure for each lobe.

The radial expansion of the lobes 17 and 18 is conveniently controlled by two corresponding annular opposition bells 19 and 20 to be coaxially positioned about the air bag 7 and movable, independently of each other, in an axial direction to the drum 6.

Preferentially, the first and second bells 19, 20 have differentiated diameters with respect to each other, so that one of them, the first bell 19 in this example, may be introduced telescopically into the other without mechanical interference.

It is to be noted that the longitudinally inextensible character of the air bag 7 offers the possibility of controlling the expansion profile of the lobes 17 and 18 in an axial direction too, by varying the axial position of each annular bell relative to the center line of the drum at the beginning of the expansion step of the two lobes. In other words, since the air bag seen in radial cross section is transversely inextensible and, when inflated, each lobe has one end held fast between the adjacent edge of the bead core and the mating ring 15, it is clear that the width of the lobe portion facing the bead core, that is the radial extension of the air bag portion freely expansible between the bead core edge and the axially inner edge of the bell depends both on the diameter and the axial position of the bell on the drum when the air bag is being inflated.

In accordance with a looping method of the present invention, operation of the apparatus 1, described above mainly as regards structure, is as follows.

The apparatus 1 is previously arranged with the air bag 7 in a deflated condition, as shown in FIG. 1. Under this situation, the circumferential laying down of the coating structure 3 around a median area of the inflatable air bag 7 is carried out with the aid of feed means not shown as known per se and not of importance to the ends of the invention. This step can be executed in successive deposition stages during which said ribbon of rubberized fabric 5 and the elastomeric coating layer 4 are laid down and superposed on each other.

Alternatively, laying down of the rubberized fabric ribbon 5 and coating layer 4 can take place simultaneously, for example by tangentially feeding the strips at different points of the circumferential extension of the drum 6 while the latter is being driven in rotation, or by feeding the drum with the two strips previously coupled to each other.

In any case, the coating structure has an overall width larger than the circumference of the cross sectional profile of the bead core 2, in order to enable a mutual overlapping of its side edges following the enfolding operation around said bead core: said coating structure is fitted on said air bag at the clasping sectors 14 of the drum 6, at an axially offset position relative to the equatorial plane of said drum, depending on the position that said overlapping must have relative to the equatorial plane of the bead core.

Subsequently, by positioning means also not shown and known per se and not of importance to the ends of the invention, the bead core 2 being worked is placed in a coaxial relationship with the drum 6, radially outward of the clasping sectors 14, on the center line of the equatorial plane of said drum.

The clasping sectors 14 are then expanded (FIG. 2) and urged against the radially internal surface 2a of the bead core 2, by simultaneously moving them from the rest position to the work position. Following operation of the clasping sectors 14, the mutual positioning of the bead core 2 and coating structure 3 on the work portion 12 of the air bag 7 is fixed.

By supplying air or other working fluid through the passages 16, the air bag 7 is then inflated (FIG. 3) in order to form the above described first and second lobes 17, 18. The annular opposition bells 19, 20 arranged coaxially at predetermined axial positions, and disposed laterally on the other side from the bead core 2, counteract the radial expansion of said lobes, which brings about expansion of the air bag also in the axial direction. On the other hand, as already said, because the rubberized fabric forming the air bag 7 is axially inextensible, simultaneously with the radial expansion of the lobes 17, 18 and the exact positioning of the bells in relation to the equatorial plane of the drum, the control of the expansion profile of the lobes on the portion disposed alongside the bead core is also carried out, that is, the shape of the radially extending profile of each lobe is also determined. The inner pressure of the air bag 7 can be advantageously adjusted to any desired value, without variations in volume of the air bag itself and/or other deformations thereof being involved.

In a preferential solution, the inner pressure of the air bag 7 at the end of the inflating step has a value in the range of 2 to 4 bars, preferably about 3 bars.

Under this situation, by effect of the inner pressure of the air bag 7, the first and second lobes 17, 18, upon the action of the work portion 12, respectively cause bending of first and second side flaps 3b, 3c of the coating structure 3 towards a first and a second side surface 2b, 2c of the bead core 2; obviously, depending on the positioning of the coating structure with respect to the bead core, said side flaps will have different lengths.

Then the first opposition bell 19 is axially displaced (to the right as shown by the arrow) towards the bead core 2, so that the first lobe 17 defined by the air bag 7 encompasses the bead core itself, as shown in FIG. 4. Under this situation, the first side flap 3b of the coating structure 3 is applied to the first side surface 2b and a portion of the radially external surface 2d of the bead core 2, with a thrust pressure corresponding to the inner pressure of the air bag 7.

When the axial displacement of the first bell 19 has been completed, the second bell 20 is axially displaced (to the left, see arrow) towards the bead core 2, so that the second lobe 18 encompasses the bead core itself in the same manner as with reference to the first lobe 17. This situation as shown in FIG. 5 causes the application of the second side flap 3c to the second side surface 2c and the portion of radially external surface 2d of the bead core 2 not covered by operation of the first lobe.

It should be noted that, by virtue of the value of said thrust pressure during the encompassing operation, the complete evacuation of air between the bead core surface and coating structure is achieved, as well as a tensioned application of the reinforcing elements of said structure, that is the reinforcing cords of the ribbon 5.

Figure 5:
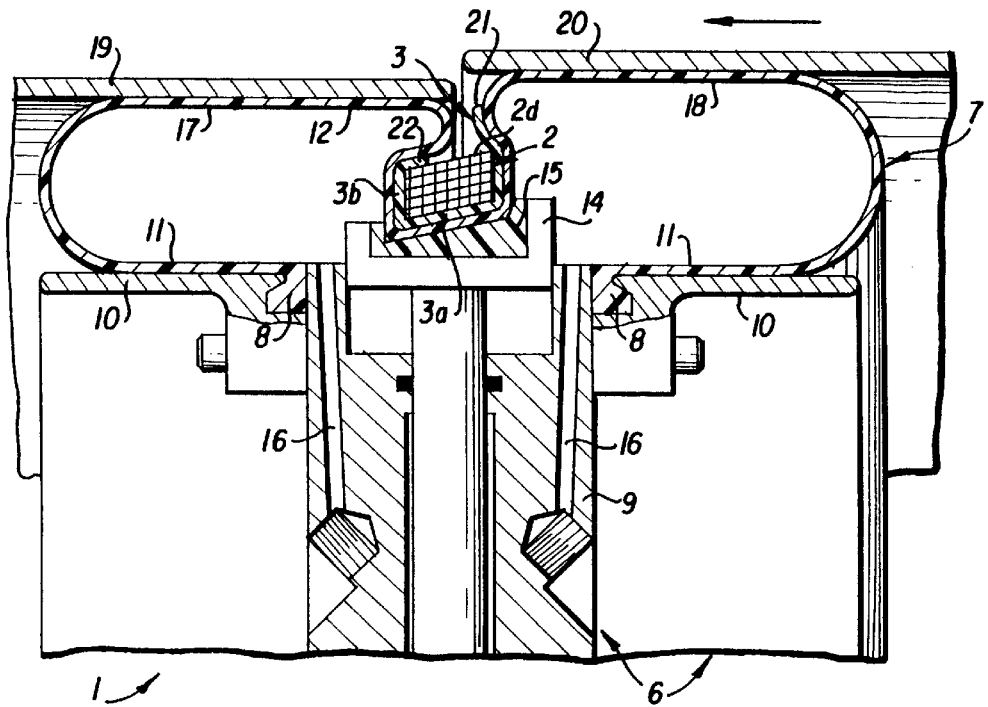
FIG. 5 shows a step subsequent to the one shown in FIG. 4, in which a second annular opposition bell is axially moved towards the first annular opposition bell.

In accordance with the present invention, the axial displacement of the second bell 20 goes on until the second lobe 18 comes into contact or in close proximity with the first lobe 17 still urged against the first side flap 3b of the coating structure 3 as shown in FIG. 5. Since the coating structure 3 has an overall width slightly larger than the circumference of the cross sectional profile of the bead core 2, at the end of this step the end edge 21 of the second flap 3c is still present on the surface of the second lobe 18 separated from the bead core. The edge 21, is to be overlapped with the end edge 22 of the first flap 3b, but this overlapping is inhibited by the presence of lobe 17.

During said movement of the second annular bell towards the bead core, the first annular bell can be moved away from the bead core, provided that the first lobe 17 does not leave the end edge 22 of the first flap 3b, but preferably it still keeps the achieved position and, if necessary, telescopically slides within the second bell 20 moving close to the bead core itself. When the two lobes 17 and 18 have come into mutual contact, in the above described terms, in order that the end edge 21 of the second flap 3c may be overlapped with that of the first flap 3b, it is necessary for the first opposition bell 19 to be retracted axially away from the bead core 2, so that the first flap will be disengaged from the first lobe 17 and become accessible to the second flap; consequently, the two bells 19 and 20 are moved together to the left in an extension of the preceding translation of the second bell, so that, while the first lobe 17 is progressively leaving the end edge 22 of the first flap 3b, the second lobe 18 simultaneously causes the end edge 21 of the second flap 3c to be overlapped therewith and presses them on each other. These movements are indicated by the arrows in FIG. 6. It should be noted that the first lobe 17 can disengage itself from the first flap 3b by the effect of the already mentioned very low surface adhesiveness of the air bag 7, so that the adhesiveness between the metal bead core wires and the elastomer material layer, though weak, is however higher than that between the air bag 7 and coating structure 3. In addition, the simultaneous combined translation of the two bells releases the flap 3b along reduced successive axial portions of its circumferential extension on the bead core; thus it is possible to eliminate the risk that, as a result of the complete disengagement of the first lobe 17, the first flap 3b can be, by effect of the elastic return induced by the tensioned state in which the reinforcing elements (cords) are, separated from the radially external surface 2d of the bead core 2 at one or more points of its extension, before overlapping has occurred and consequently before the second flap 3c has been joined by effect of the intrinsic adhesiveness of the elastomeric material of the coating structure itself. In fact, detachment of the first flap 3b would irreparably impair the correct execution of the enfolding or looping operation of the coating structure 3, which will make the whole bead core 3 unusable.

Anchoring of the two end edges 21, 22 in mutual overlapping, as previously stated, is the condition ensuring the complete stability of the coating structure 3 applied to the bead core 2 during the necessary handlings for manufacturing the tire.

Figure 6:
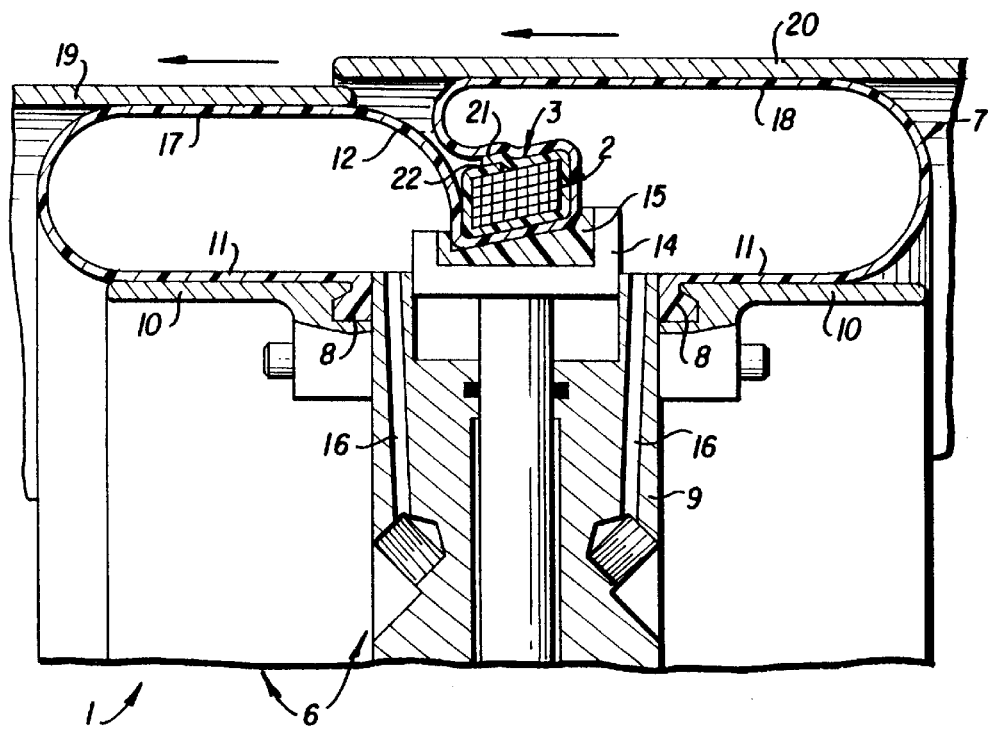
FIG. 6 shows a step in which the two opposite flaps are overlapped on completion of the application of the coating structure to the bead core.

The axial combined translation of the two bells to the left as seen in FIG. 6 goes on therefore until the second lobe 18 has completely caused the overlapping of the second flap 3c on the first flap 3b, the junction between the two flaps being completed and the bead core has been completely incorporated in its coating structure. At this point, the clasping sectors 14 are radially contracted so that they release the looped bead core from the mating ring 15 and the air bag 7 is deflated and brought back to the starting configuration as shown in FIG. 1. It will be recognized that during this step, by virtue of the presence of said premoulded pieces 13 acting as centering elements, the air bag can lay down again on the drum at a perfectly centered position relative to the equatorial plane thereof; it therefore eliminates the risk that, an irregular deposition will take place in a subsequent expansion step when a second bead core is being worked. Thus the air bag will not create two irregular lobes which would undesirably influence their expanding profile and probably give rise to a faulty and useless enfolding of said bead core.

In conclusion, it will be now recognized that the overlap width between the two flaps depends on the difference between the width of the coating structure and the circumference of the bead core, whereas the overlap position on the bead core surface depends on the mutual positioning between the center line planes of the bead core and its coating.

The present invention attains the intended purposes.

The present method and apparatus enable the application of the coating structure 3 by looping to be carried out in a very quick and reliable manner even when the adhesion of the coating structure to the bead core surfaces is very critical. With reference to the above described embodiment, the application of the coating structure 3 to the outer surfaces of the bead core 2 is made particularly difficult due both to the fact that the bead core, being made of bare metal, offers a low adhesiveness, as known, to the elastomeric material and to the fact that the coating 3, because of the presence of the reinforcing cords in the strip 5, exhibits a strong tendency to resume its original configuration after the enfolding steps around the bead core section.

However, due to the important pressures exerted by the air bag 7 against the bead core surfaces and the reduced surface portion of the first flap 3b that is disengaged from the corresponding lobe of the air bag before the second flap 3c is applied, all risks of even partial detachment of said first flap from the bead core are avoided.

It will be also recognized that the method and apparatus in question advantageously carry out the application of the coating structure by exerting on said coating structure itself and the bead core, pressures that are uniformly distributed over the whole circumferential extension of the bead core, unlike the known methods and apparatus, for example those carrying out looping by rolling, where bending of the coating structure and application of same to the bead core surfaces involve the instantaneous application of pressures concentrated on distinct points of the circumferential extension of the bead core, thereby causing localized deformations and dangerous variations in the geometry of the transverse section thereof.

Figure 7:
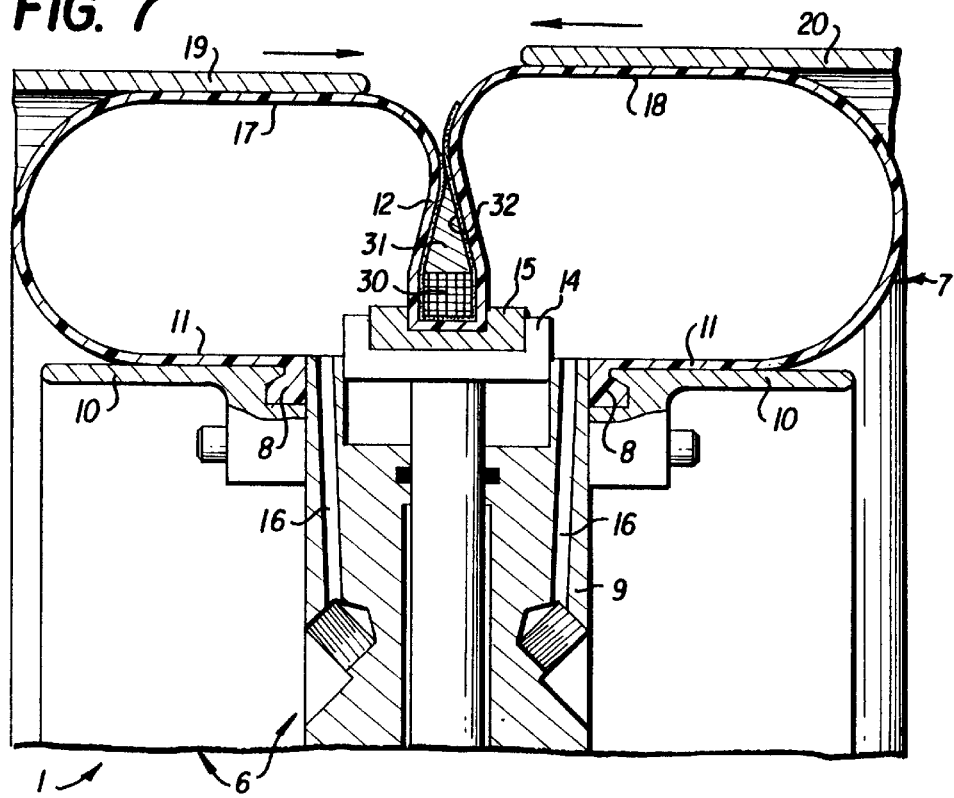
FIGS. 7 and 8 show two alternative operations (a looping operation without overlapping of the flaps and the application of a reinforcing element, respectively) on a different type of annular reinforcing element, also feasible with the machine of the invention.
Figure 8:
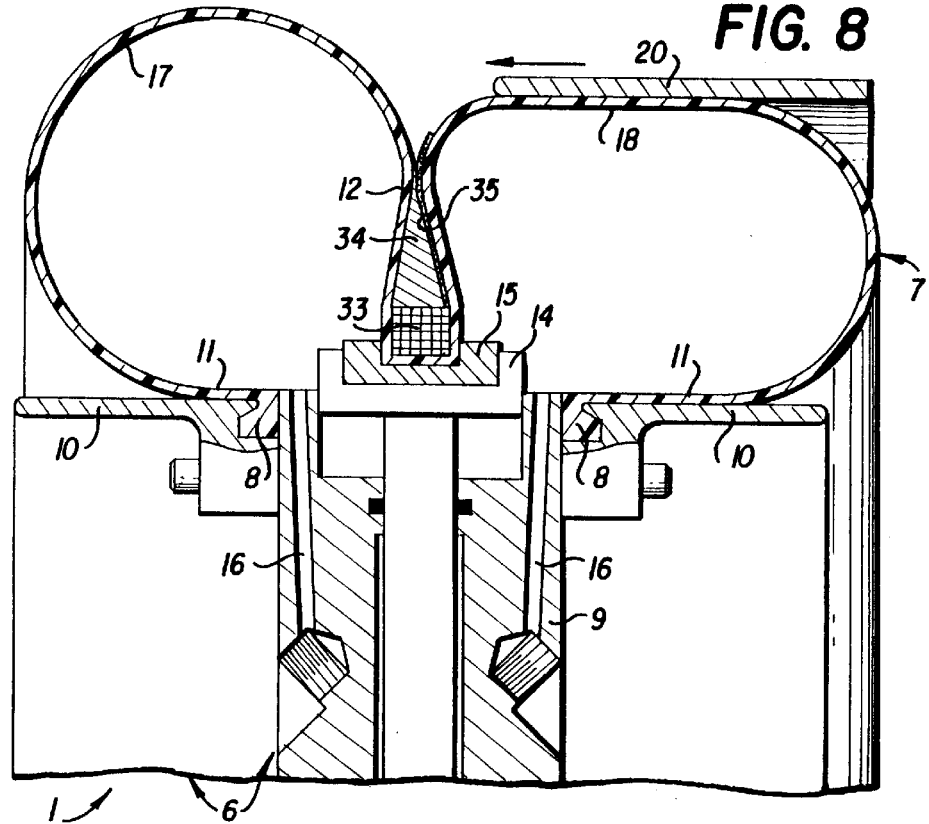

In addition, the machine of the invention is also very versatile and capable of putting into practice a series of working processes that according to the known art have hitherto required the use of several different machines. In particular, it is pointed out that the use of the machine of the invention is not limited to looping or enfolding of the previously described bead cores of the pack type, but is adapted to enfolding or partial coating of any type of bead core: FIGS. 7 and 8 show, by way of example, two alternative operations (enfolding without overlap of the flaps and application of a side reinforcing element) that can also be carried out by the machine of the invention, on current bead cores provided with known elastomeric fillers which have, in cross section, a tapered shape, and are positioned on the radial outer surface of the bead core. It should be noted that these bead cores could also be of the above mentioned pack type, first enfolded according to the invention and then assembled to said filler.

FIG. 7 shows looping of a well known annular reinforcing structure (comprising a bead core 30 assembled to a triangular shaped filler 31) with a strip 32 of elastomeric material or rubberized fabric having flaps with identical (not shown) or differing radial extensions. On the contrary, FIG. 8 shows a different operation comprising applying a reinforcing strip 35 to a single axial surface of the bead core 33 and/or the filler 34 thereof, which reinforcing strip may optionally project radially towards the outside from the filler top, without causing deformations to the filler or, alternatively, by imposing an exactly controlled deformation to the filler through an appropriate control of the axial strokes of the annular bells and/or the different pressure values in the two lobes. Said controlled deformation may be, for example, the well known bending in an axial direction (not shown) that the bead core fillers must have when assembled to the carcass plies by the use of drums of the rigid type, provided with an undercut on the shoulders.

From the foregoing description it will be apparent without further details being added that it is possible to execute the above operations through application of the process of the invention with appropriate modifications. For example, the combined translation of the two bells, as shown in FIG. 7, can be eliminated or both lobes may be used but with a single bell. It is clear that all these operations are possible due to the combined effect of the independent movement of the two annular opposition bells together with the control of the expansion profile of the two lobes 17 and 18 under an inflating situation.

Obviously, the invention as conceived is susceptible of many modifications and variations, all of them falling within the scope of the appended claims.

I claim:

1. An apparatus for looping a coating structure on a motor-vehicle tire bead core comprising:

a support drum;

an inflatable air bag having two circumferential anchoring beads coaxially fastened to the support drum, two connecting portions extending mutually away from said anchoring beads and one work portion radially external to said drum and extending between opposite ends of said connecting portions;

a plurality of radially movable clasping sectors distributed circumferentially on the drum and radially movable relative thereto between a rest position in which they are radially retracted towards the drum, and a work position in which they are radially extended and project from the drum in order to urge said work portion of the air bag against the radially internal surface of a tire bead core which is coaxially positioned on the drum;

fluid feeding means communicating with the inside of the air bag for inflating said air bag from a deflated condition in which it is disposed substantially flattened in a cylindrical configuration against said drum to an inflated condition in which it is radially expanded so as to form first and second lobes located on axially opposite sides relative to said plurality of clasping sectors urged against said bead core;

a first annular opposition bell to be coaxially positioned around the air bag to counteract the radial expansion of said first lobe, means for mounting said first annular bell to be axially movable relative to the drum for enfolding the first lobe around one side surface and the radially external surface of the bead core;

a second annular opposition bell disposed coaxially opposite to said first bell for positioning around the air bag in order to counteract the radial expansion of said second lobe, means for mounting said second bell to be axially movable relative to the drum, independently of said first bell, for enfolding the second lobe around a second side surface and the radially external surface of the bead core, wherein said annular opposition bells have different diameters.

2. An apparatus according to claim 1 in which said inflatable air bag is formed of a rubberized fabric made inextensible in the axial direction relative to the air bag.

3. An apparatus according to claim 1 in which said air bag, at the opposite ends of the connecting portions, has premoulded centering pieces folded back through 360°.

4. An apparatus according to claim 1 in which in said air bag the work portion is externally coated with non-adhesive material.

5. An apparatus according to claim 1 in which said drum comprises at least one elastic ring circumferentially engaged about said clasping sectors.

6. An apparatus according to claim 5 in which said elastic ring has at a radially external position, an engagement seat for substantially mating with the radially internal surface of the bead core.

7. An apparatus according to claim 1 in which said annular bells are sufficiently axially movable to overlap when enfolding the second lobe around the second side surface to overlap edges of the coating structure.

8. An apparatus according to claim 1, wherein the circumferential anchoring beads are sealingly engaged to the support drum.

* * * * *